Feb. 19, 1935.  G. HEYMER  1,991,670
APPARATUS FOR PROJECTING LENTICULAR FILMS IN NATURAL COLORS
Filed Nov. 6, 1931
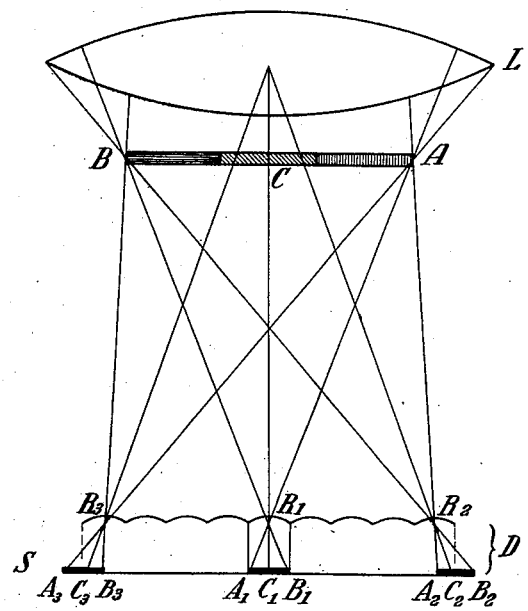
Inventor:
Gerd Heymer,
By Attorney
Philip S. Hopkins.

Patented Feb. 19, 1935

1,991,670

UNITED STATES PATENT OFFICE 1,991,670

APPARATUS FOR PROJECTING LENTICULAR FILMS IN NATURAL COLORS

Gerd Heymer, Dessau-Anhalt, Germany, assignor to Agfa Ansco Corporation, Binghamton, N. Y., a corporation of New York Application November 6, 1931, Serial No. 573,467
In Germany November 13, 1930

2 Claims. (Cl. 88—16.4)

My present invention relates to the reproduction of pictures taken on lenticular films in their natural colors.

According to the well-known Berthon process (see U. S. Patent No. 992,151) for taking pictures in natural colors, there is provided in the plane of the diaphragm of the objective a multi-color filter, from which images are produced in the light-sensitive layer by means of the refractive microscopic lens elements of the film. In order to ensure that these images are reproduced in their natural colors in the projection of the film, an objective must be employed having the same properties as the objective employed in taking the pictures. This process, however, does not take into account that for projection, there are, in general, employed such objectives which have a different focal length from those employed in taking the pictures.

I have found that the reproduction of pictures taken on lenticular films in their natural colors is obtained, irrespective of different objectives being used in taking and projecting the pictures by means of a multi-color filter which is geometrically identical with the filter used for the exposure or the virtual image thereof and which is fitted in projection, between the film and the objective at the same distance from the film plane as the filter used in taking the pictures, or the virtual image of this filter respectively.

As the optical conditions for taking and reproducing are intimately related, the following description first sets out the optical arrangement in the taking operation and then that employed in projection.

The accompanying drawing serves to illustrate my invention diagrammatically. The figure shows the new method of projecting, by way of example, the arrangement for taking and projecting the picture being the same.

In the figure the color filter AB having the center C is in taking the picture arranged between the objective lens L and the film D bearing the lenticular elements $R_1$, $R_2$, $R_3$ by which the real pictures $A_1B_1$, $A_2B_2$, $A_3B_3$ of said color filter are produced in the light sensitive layer S. The size of these real pictures depends upon the size and the distance of the color filter AB from the film plane and on the thickness of the film. In projecting, a color-true reproduction of the images is ensured, if a filter is employed which has the same size as that originally used for taking the pictures and if the color filter is arranged at the same distance from the film plane as the filter used for taking the pictures. The reproduction of the colors is not affected if the projection is effected by an optical means which is different from the objective employed in taking the pictures, nor are the colors changed by adjusting the optical systems so as to obtain different focal distances.

In taking the pictures, the multi-color filter can only be arranged between the film and the objective if the optical properties of the latter are not impaired thereby, and if the focal length of the objective is not too short. If the optical system requires the multi-color filter to be arranged in front of or in the objective, the image reproduced below each lenticular element of the film corresponds to the virtual image of that filter.

In this case also a projection in true colors is obtained if the distance of the color filter from the film is equal to the distance of the virtual image of the filter from the film during the exposure. The projecting objective is arranged in front of the multi-color filter remote from the film.

If the multi-color filter is arranged in front of the objective when taking a picture, and in certain cases if the filter is arranged in the objective the multi-color filter used in projection cannot have the same distance as the multi-color filter or its virtual image in taking the picture, in case the objective used in projection has the same or a shorter focal length as that used in the taking operation. In this case the distance of the filter from the film is adapted as much as possible to that of the multi-color filter or its virtual image in the taking operation. By these means the advantage of arranging the filter between the film and the objective is not lost and in the practically important cases a sufficiently true reproduction of the colors is obtained.

If during the exposure the objective be adjusted successively so as to obtain the requisite focusing for near and distant scenes, the position of the virtual image will simultaneously be shifted in accordance therewith. In order during the projection to prevent the position of the filter from being changed in conformity with any alteration of the focal length of the optical system the color filter is preferably arranged at a distance from the film plane that corresponds to that of the virtual image of the filter from the film, when the object to be taken is at a medium distance from the objective, preferably at a distance of about 5 m.

It may be understood that the term "a multi-color filter goemetrically identical" where it occurs in the specification and the following claims is to include a multi-color filter having not only the same size as the multi-color screen or its virtual image to which it relates but also being positioned as closely as possible at the same distance from the film in projecting as in taking.

What I claim is:—

1. In a device for projecting lenticular film in combination, a lenticular film to be projected bearing a silver picture in its emulsion layer, a multi-color filter geometrically identical with the multi-color filter used in taking the original or the virtual image thereof arranged at a distance from said lenticular film to be projected corresponding with that of the multi-color filter or its virtual image from the lenticular film in taking and facing the lenticular elements of the film to be projected, and an objective having a focal length greater than that of the objective used in taking, arranged in front of said film on the side of the multi-color filter and having such an extension in direction of the optical axis that the distance of the rear lens of the objective from the film is greater than the distance of the multi-color filter or its virtual image from the film in taking, when the lenticular film is in focus with said objective, so as to produce an enlarged picture of the original in natural colors.

2. In a device for projecting lenticular film in combination, a lenticular film to be projected bearing a silver picture in its emulsion layer, a multi-color filter geometrically identical with the multi-color filter used in taking the original or the virtual image thereof arranged at a distance from said lenticular film to be projected corresponding with the mean value of the several distances of the multi-color filter or its virtual image from the lenticular film in taking and facing the lenticular elements of the film to be projected and an objective having a focal length greater than that of the objective used in taking, arranged in front of said film on the side of the multi-color filter and having such an extension in direction of the optical axis that the distance of the rear lens of the objective from the film is greater than the greatest distance of the several distances of the multi-color filter or its virtual image from the film in taking, when the lenticular film is in focus with said objective, so as to produce an enlarged picture of the original in natural colors.

GERD HEYMER.